July 24, 1956  W. MÜLLER  2,756,201
ELECTROLYSIS OF CHLORIDE SOLUTIONS AND CELL THEREFOR
Filed Jan. 30, 1951  2 Sheets-Sheet 1
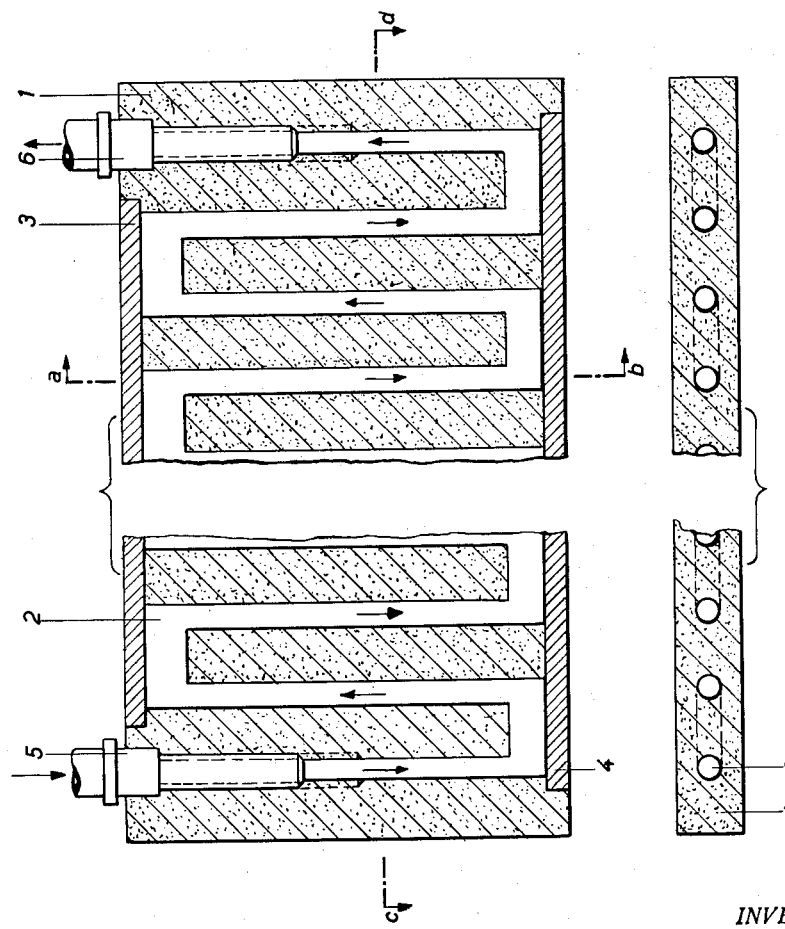
INVENTOR.
WILHELM MÜLLER
BY Burgess Dinklage
ATTORNEYS July 24, 1956 W. MÜLLER 2,756,201
ELECTROLYSIS OF CHLORIDE SOLUTIONS AND CELL THEREFOR
Filed Jan. 30, 1951 2 Sheets-Sheet 2
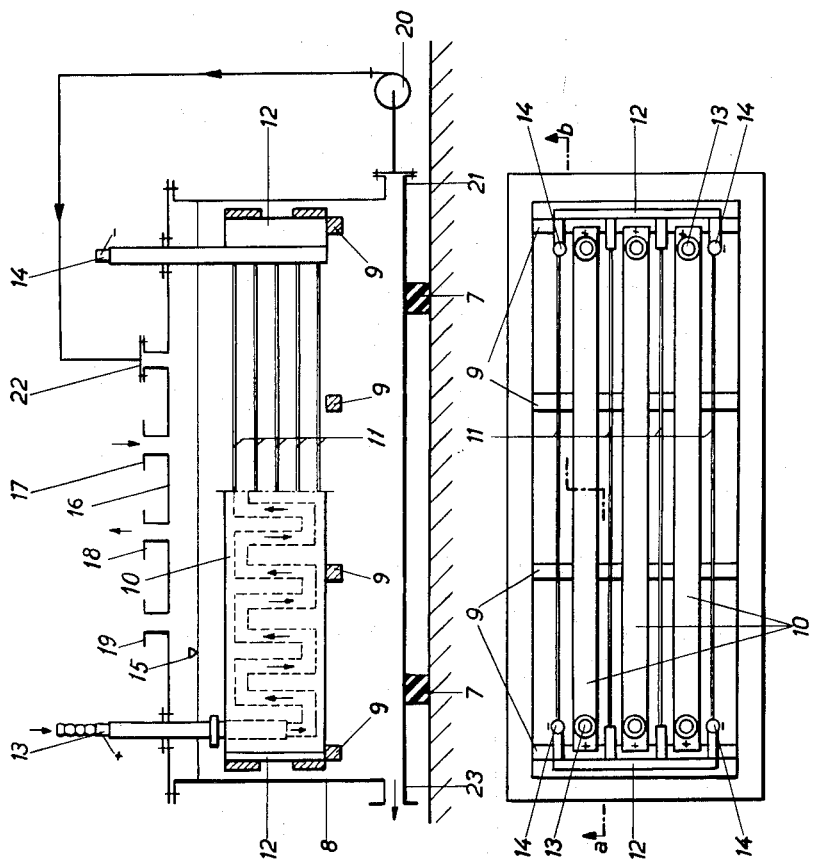
INVENTOR.
WILHELM MÜLLER
BY Burgess + Dinklage
ATTORNEYS 2,756,201
ELECTROLYSIS OF CHLORIDE SOLUTIONS AND CELL THEREFOR Wilhelm Müller, Leverkusen, Germany, assignor to Farbenfabriken Bayer Aktiengesellschaft, Leverkusen, Germany, a corporation of Germany Application January 30, 1951, Serial No. 208,470
Claims priority, application Germany February 6, 1950
2 Claims. (Cl. 204—95)

The electrolytic production of chlorates from aqueous solutions of the corresponding chlorides was hitherto effected in cells which were either provided with anodes of platinum, magnetite or graphite. To avoid the high reduction at the iron cathodes bichromate was added to the electrolyte. Magnetite and graphite anodes are mostly used technically. Platinum because of its high costs is not used much.

Magnetite electrodes are poor conductors requiring increased electrical voltage and accordingly the consumption of energy is high. Cells provided with magnetite electrodes can be operated with a good current yield of about 83–86% only when using in the end stage chlorate concentrations of maximum 280–300 g. NaClO₃ per liter. When using stronger concentrations the current yields fall rapidly; besides, in acid electrolytes, an undesirable perchlorate formation takes place. When using magnetite electrodes the heat development is high. In order to maintain the favorable operating temperature of 70° C. the cells require large quantities of cooling water. A favourable reaction according to the equation $$NaOCl + 2HClO = NaClO_3 + 2HCl$$

is only possible with low current concentrations of about 2 amp. per liter, requiring relatively large cells.

The disadvantages of the slight conductivity and tendency of perchlorate formation are avoided by using instead of magnetite electrodes graphite anodes. The consumption of graphite anodes, however, is relatively high. It is decreased with falling bath temperature but even at temperatures of 35–40° C. it still amounts to 0.4–1 kg. of graphite for 100 kg. NaClO₃. Cooling is effected in general by means of polarized cooling coils of iron which are installed inside the electrolyser.

The present invention relates to a graphite anode shaped as a cooling aggregate that has been rendered waterproof by means of an inert impregnating agent, to be used for operating electrolytic cells, in particular for producing chlorates such as alkali metal and alkaline-earth metal chlorate. It also relates to an electrolytic cell containing the graphite anode.

The impregnating agent used for rendering the graphite anode waterproof must be inert under the reaction conditions, that is to say it must be unsaponifiable, insoluble and non-fusible. These conditions are complied with by many plastics and artificial resins especially resins on the basis of phenol and its homologues, such as xylene formaldehyde resins, plastics of polyvinylchloride and the like. Fused AgCl₂ can also be used as the impregnating agent in place of organic plastics. The consumption of graphite when installing these impregnated graphite anodes shaped as a cooling aggregate amounts to only 0.1–0.2 kg. of graphite per 100 kg. NaClO₃ produced.

Furthermore it was found that when using an anode of the kind described the current density can be varied between 0.02 and 0.15 amp. per sq. cm. without any remarkable change of the current yield or perchlorate formation occurring. It has proved suitable to use current densities of 6.06–0.1 amp. per sq. cm. In that case the current yields amount to 83–85%, the kilowatt consumption per hour is 570–580 for 100 kg. NaClO₃ produced, the graphite consumption is 0.1–0.2 kg. per 100 kg. of chlorate produced. When using magnetite electrodes it is not feasible for economic reasons and in order to avoid excess perchlorate formation to go beyond 0.02 amp. per sq. cm. in the current density. In that case the energy consumption amounts to about 650–680 kilowatts per hour for 100 kg. NaClO₃ produced with current yields of 85–86%. Baths equipped with magnetite electrodes must have a current concentration of about 2 amps. per liter so that the chemical reaction of sodium hypochlorite with hypochlorous acid as shown by the equation $$NaOCl + 2HOCl = NaClO_3 + HCl$$

can be completed. Surprisingly it was found that in cells of the kind described above the current concentration may be up to 8 amps. per liter of electrolyte with the maintenance of the anodic current density mentioned and an acidity in the electrolyte of 0.02–0.04 mol HCl per liter without causing a decrease of the current yield. Even with these high current concentrations and the low temperature of only 35–40° C. the chlorate formation proceeds with a sufficiently high velocity. This is surprising since it was previously believed that for completing the said reaction, high temperature and considerable time were required.

Finally, the higher current concentrations render it possible to construct small cells with high current charges, thus saving space and expenses.

Hitherto the electrolytic production of chlorates was effected in cells operating with iron cathodes. At these iron cathodes very high reduction occurs unless chromates are added to the electrolyte. When evaporating the chlorate from electrolytes of the kind specified a chlorate is obtained which due to the chromate is yellow colored and must be purified for that reason, causing additional working processes. The reduction at the cathode can be avoided by using dull chromium plated iron cathodes, in place of the iron cathodes. The chromium metal cathodes brightly plated with chromium plated electrodes yield unsatisfactory results. The effect displayed by the dull chromium plated electrodes is due to the fact that deposited chromium is oxidized to chromic acid by means of hypochlorite and is subsequently reduced to chromic chromate which then displays its protective action.

Chromium plated cathodes were not used up to now because it was not possible to produce chromium layers which were free of pores and flaws, and accordingly their use over a period of time caused a reduction of the cathode.

According to a preferred feature of the invention these disadvantages are overcome when using cells containing cathodes of chromium nickel plated wire, the so-called stainless steel. Cells provided with cathodes of that kind display reduction values which correspond to the values obtained with iron cathodes to which chromate has been added if the acidity of the electrolyte is kept between 0.02 and 0.04 mol HCl per liter. A higher acidity increases the reduction losses whereby values are obtained that correspond to the values of iron cathodes without the addition of chromium.

Thus, for instance, a cell operated with cathodes of stainless steel having a cathodic current density of 0.05–0.2 amp. per sq. cm. showed the following reduction losses:

| Acidity of the electrolyte: | Reduction losses per cent |
|---|---|
| 0.1 mol HCl per liter | 7.0 |
| 0.02 mol HCl per liter | 5.5 |
| 0.03 Mol HCl per liter | 4.0 |
| 0.04 mol HCl per liter | 4.8 |
| 0.05 mol HCl per liter | 7.0 |
| 0.07 mol HCl per liter | 16.0 |

These results are surprising and could not be foreseen because

1. Pure chromium metal as well as nickel display a high reducing action which also by the addition of chromate which is not lowered to a considerable extent by the addition of chromium;
2. The formation of chromium chromate according to the prevailing theories can hardly be explained. It would mean that chromium is converted into chromic chromate while being split off from the alloy. If this would be the case it cannot be understood why nickel does not freely display its reducing action.

In the attached drawing a graphite anode shaped as cooling aggregate and an electrolytic cell containing graphite anodes and cathodes of chromium nickel steel are schematically illustrated by way of example.

Figure 1 is a longitudinal section of the anode,
Figure 2 a cross section of the anode along the line $a$—$b$ of Fig. 1,
Fig. 3 is a longitudinal section along the line $c$—$d$ of Fig. 1,
Fig. 4 is a longitudinal section of the electrolytic cell,
Fig. 5 is a cross section, and
Fig. 6 is a top view without the cover.

The anode consists of a plate 1 of graphite being provided on the inside with meandrically running channels 2 through which flows the cooling liquid. The channels 2 are closed at the narrow sides of the plates by means of borders 3 and 4. The cooling liquid enters at 5, flows through the plate in the direction of the arrow and leaves at 6. The cooling aggregate as described is rendered waterproof by means of an inert impregnating agent.

As can be sen from Figures 4, 5 and 6, the electrolytic cell is composed of a container 8 for holding the electrolytic solution, said container which rests upon the insulating beams 7. In the container 8 resting upon supports 9 the graphite anodes 10 cooled by means of a liquid and the cathodes 11 made of chromium nickel steel rods are arranged. The cathodes are held in place by fasteners 12. The current is led into the anodes 10 through the cooling pipe at 13, it leaves the cell at 14. 15 indicates the liquid level of the electrolyte. Upon the cover 16 of the container 8 there is arranged a supply-pipe 17 for the electrolyte, an airing pipe 18 and an opening for the thermometer 19. For repumping the electrolyte a pump 20 is installed which is connected to an opening 21 at the bottom of the container 8 and which reconveys the electrolyte through the opening 22 in the cover 16 into the container 8. An outlet 23 serves for discharging the electrolyte. All parts coming into contact with the electrolyte except the anodes and cathodes with their current connections are lined with a material being stable to chemical corrosion, for instance rubber or a plastic material.

I claim:

1. In the process for the preparation of a water soluble chlorate by the electrolysis of an aqueous chloride solution, the improvement which comprises electrolyzing an aqueous chloride solution between a graphite anode and a chromium, nickel stainless steel cathode at an anodic current density of about 0.02 to 0.15 amps. per sq. cm. while maintaining the active surface of the graphite anode at a temperature of about 35 to 40° C. by internal cooling and maintaining the acidity of said solution at a calculated value of from 0.02 to 0.04 mol. HCl per liter, and recovering the corresponding water-soluble chlorate.

2. An electrolytic cell for the production of a chlorate by electrolysis of a chloride comprising a hollow graphite anode water-proofed with an inert impregnating agent, means for passing cooling medium into the hollow interior of said anode, a chromium, nickel stainless steel cathode spaced from said anode, and means for passing current between said anode and cathode when the cell contains a chloride solution at an anodic current density of about 0.02 to 0.15 amps. per sq. cm.

References Cited in the file of this patent

UNITED STATES PATENTS

| | | |
|---|---|---|
| 1,521,002 | Brace | Dec. 30, 1924 |
| 1,988,059 | Van Loon | Jan. 15, 1935 |
| 2,193,323 | Nitschke | Mar. 12, 1940 |
| 2,433,212 | Gleave | Dec. 23, 1947 |

FOREIGN PATENTS

| | | |
|---|---|---|
| 110,284 | Switzerland | May 16, 1925 |

OTHER REFERENCES

Hackh: Chemical Dictionary, 3rd edition, page 806.
McLaren et al.: Transactions of the Electrochemical Society, vol. 79, 1941, pages 93 to 109.